US011869698B2

(12) United States Patent
Yang et al.

(10) Patent No.: US 11,869,698 B2
(45) Date of Patent: Jan. 9, 2024

(54) COIL COMPONENT

(71) Applicant: SAMSUNG ELECTRO-MECHANICS CO., LTD., Suwon-si (KR)

(72) Inventors: Ju Hwan Yang, Suwon-si (KR); Seung Min Lee, Suwon-si (KR); Byung Soo Kang, Suwon-si (KR); Byeong Cheol Moon, Suwon-si (KR); Yong Hui Li, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 928 days.

(21) Appl. No.: 16/773,071

(22) Filed: Jan. 27, 2020

(65) Prior Publication Data

US 2021/0057138 A1 Feb. 25, 2021

(30) Foreign Application Priority Data

Aug. 20, 2019 (KR) ........................ 10-2019-0101779

(51) Int. Cl.
*H01F 27/28* (2006.01)
*H01F 27/255* (2006.01)
(Continued)

(52) U.S. Cl.
CPC ........... *H01F 27/255* (2013.01); *H01F 17/04* (2013.01); *H01F 27/32* (2013.01); *H01F 41/041* (2013.01); *H01F 2017/048* (2013.01)

(58) Field of Classification Search
CPC ........ H01F 27/255; H01F 17/04; H01F 27/32; H01F 41/041; H01F 2017/048;
(Continued)

(56) References Cited

U.S. PATENT DOCUMENTS

2007/0216512 A1 9/2007 Sano et al.
2014/0009254 A1 1/2014 Ohkubo et al.
(Continued)

FOREIGN PATENT DOCUMENTS

CN 102201713 A 9/2011
CN 101038815 B 4/2012
(Continued)

OTHER PUBLICATIONS

Office Action issued in corresponding Korean Patent Application No. 10-2019-0101779 dated Aug. 14, 2020, with English translation.

(Continued)

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A coil component includes a body having one surface and the other surface, opposing each other, and one side surface and the other side surface, each connecting the one surface and the other surface to each other, opposing each other, a recess formed in each of the one side surface and the other side surface of the body to extend to the one surface of the body, a support substrate disposed inside the body, a coil portion, disposed on the support substrate, having one end portion and the other end portion exposed to the recess, an oxide insulating layer disposed on a surface of the body, and a first insulating layer disposed along a surface of the oxide insulating layer to cover the surface of the body.

14 Claims, 6 Drawing Sheets

2000

(51) Int. Cl.
*H01F 17/04* (2006.01)
*H01F 27/32* (2006.01)
*H01F 41/04* (2006.01)

(58) Field of Classification Search
CPC .. H01F 17/0013; H01F 27/292; H01F 27/324; H01F 27/28; H01F 27/24; H01F 27/306; H01F 27/2828; H01B 3/02
USPC .................................................. 336/200, 232
See application file for complete search history.

(56) References Cited

U.S. PATENT DOCUMENTS

| | | | | |
|---|---|---|---|---|
| 2014/0125194 | A1* | 5/2014 | Lee | H01G 4/012 336/200 |
| 2015/0048915 | A1 | 2/2015 | Yoon et al. | |
| 2016/0042857 | A1 | 2/2016 | Chun et al. | |
| 2016/0086714 | A1 | 3/2016 | Moon et al. | |
| 2016/0268038 | A1 | 9/2016 | Choi | |
| 2018/0182537 | A1* | 6/2018 | Shimizu | H01F 27/29 |
| 2019/0189338 | A1* | 6/2019 | Kim | H01F 17/04 |
| 2020/0020477 | A1* | 1/2020 | Kang | H01F 17/0013 |
| 2020/0035401 | A1* | 1/2020 | Yoshinaka | H01F 41/043 |
| 2020/0118729 | A1 | 4/2020 | Lim et al. | |

FOREIGN PATENT DOCUMENTS

| | | | |
|---|---|---|---|
| JP | 2005-310863 | A | 11/2005 |
| JP | 2007-165477 | A | 6/2007 |
| KR | 10-2014-0005088 | A | 1/2014 |
| KR | 10-1548862 | B1 | 8/2015 |
| KR | 10-1580411 | B1 | 12/2015 |
| KR | 10-2018-0028374 | A | 3/2018 |
| KR | 10-2020-0041696 | A | 4/2020 |

OTHER PUBLICATIONS

Office Action issued in corresponding Chinese Patent Application No. 202010288666.7 dated Nov. 9, 2023, with English translation

* cited by examiner

COIL COMPONENT

CROSS-REFERENCE TO RELATED APPLICATION(S)

This application claims the benefit under 35 USC 119(a) of Korean Patent Application No. 10-2019-0101779 filed on Aug. 20, 2019 in the Korean Intellectual Property Office, the entire disclosure of which is incorporated herein by reference for all purposes.

TECHNICAL FIELD

The present disclosure relates to a coil component.

BACKGROUND

An inductor, a coil component, is a representative passive element used in an electronic device together with a resistor and a capacitor.

A thin film type power inductor is manufactured by forming a coil portion using a plating process, curing a magnetic powder-resin composite, in which magnetic powder particles and a resin are mixed, to form a body, and forming external electrodes on external surfaces of the body.

However, in the case in which the body is formed using magnetic metal powder particles having high conductivity, plating bleeding may occur on the body when nickel and tin plating is performed while forming external electrodes on external surfaces of the body.

In addition, with the trend for miniaturization of electronic components, it is necessary to increase an insulating layer application area by the same volume while significantly reducing loss of a magnetic substance.

SUMMARY

An aspect of the present disclosure is to provide a coil component which may prevent plating bleeding of an external electrode while significantly reducing loss of a magnetic material.

Another aspect of the present disclosure is to provide a coil component having an increased insulating layer application area by the same volume.

According to an aspect of the present disclosure, a coil component includes a body having one surface and the other surface, opposing each other, and one side surface and the other side surface, each connecting the one surface and the other surface to each other, opposing each other, a recess formed in each of the one side surface and the other side surface of the body to extend to the one surface of the body, a support substrate disposed inside the body, a coil portion, disposed on the support substrate, having one end portion and the other end portion exposed to the recess, an oxide insulating layer disposed on a surface of the body, and a first insulating layer disposed along a surface of the oxide insulating layer to cover the surface of the body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
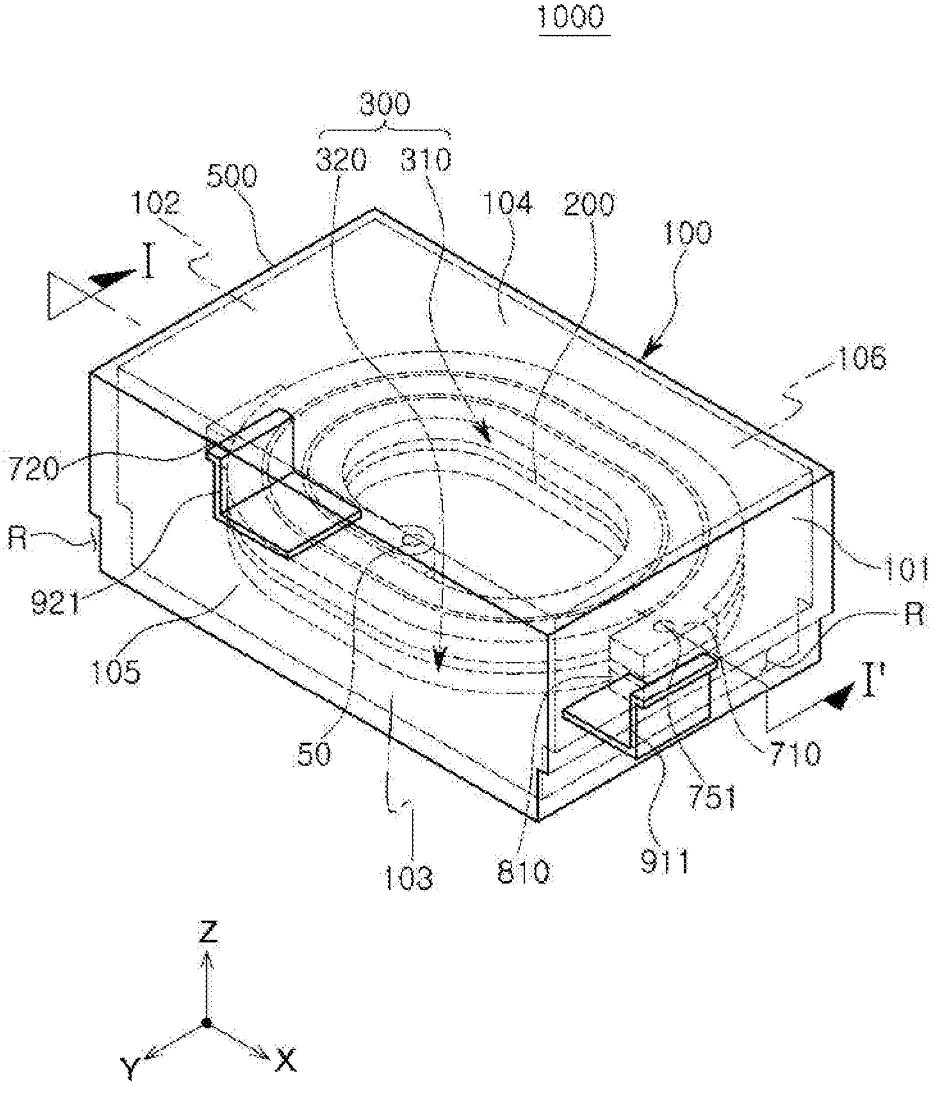
FIG. 1 is a schematic diagram of a coil component according to a first embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples of the present disclosure will be described in detail with reference to the accompanying drawings so that those skilled in the art may easily carry out the present disclosure.

In the drawing, the L direction may be defined as a first direction or a length direction, the W direction as a second direction or a width direction, and the T direction as a third direction or a thickness direction.

Hereinafter, a coil component according to an embodiment will be described in detail with reference to the accompanying drawings. Referring to the accompanying drawings, the same or corresponding components are denoted by the same reference numerals, and duplicate descriptions thereof will be omitted.

Various types of electronic components are used in electronic devices. Various types of coil components may be suitably used for noise removal or the like between these electronic components.

For example, the coil component in an electronic device may be used as a power inductor, a high frequency (HF) inductor, a general bead, a bead for high frequency (GHz Bead), a common mode filter, or the like.

First Embodiment

FIG. 1 is a schematic diagram of a coil component according to a first embodiment in the present disclosure.

Figure 2:
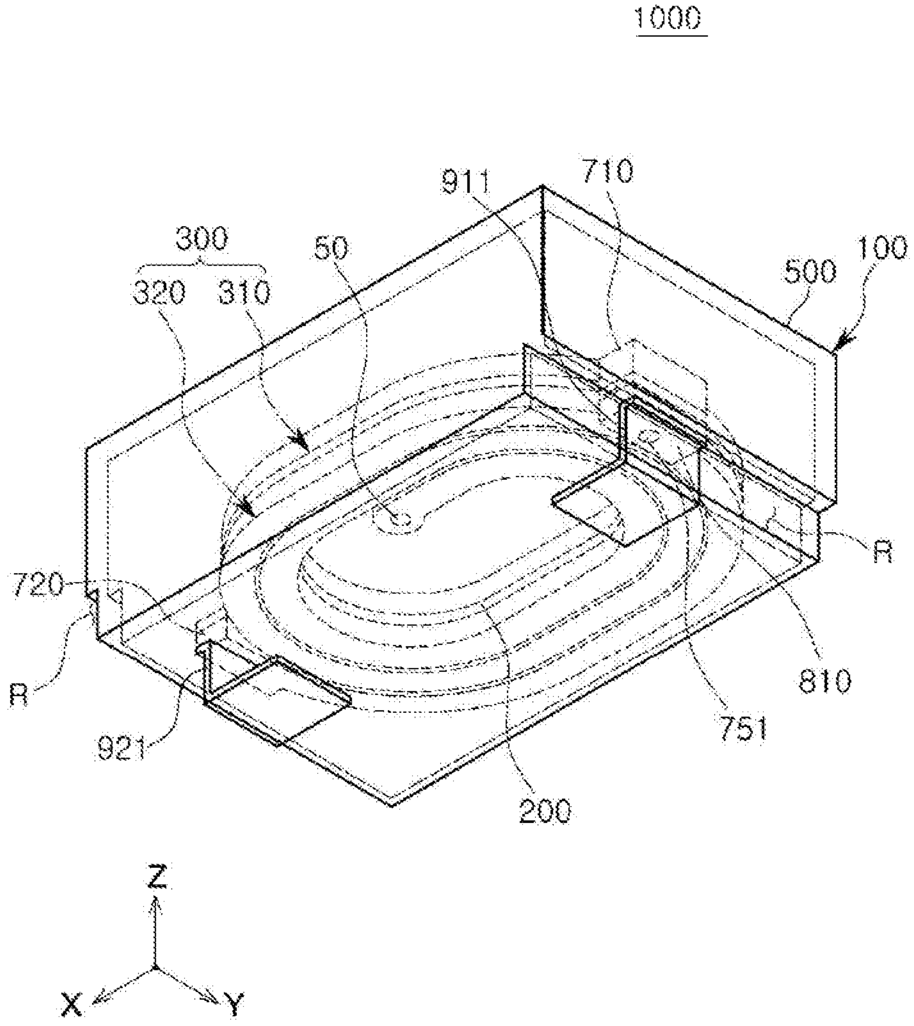
FIG. 2 is a side perspective view of the coil component in FIG. 1, viewed from a lower side.
Figure 3:
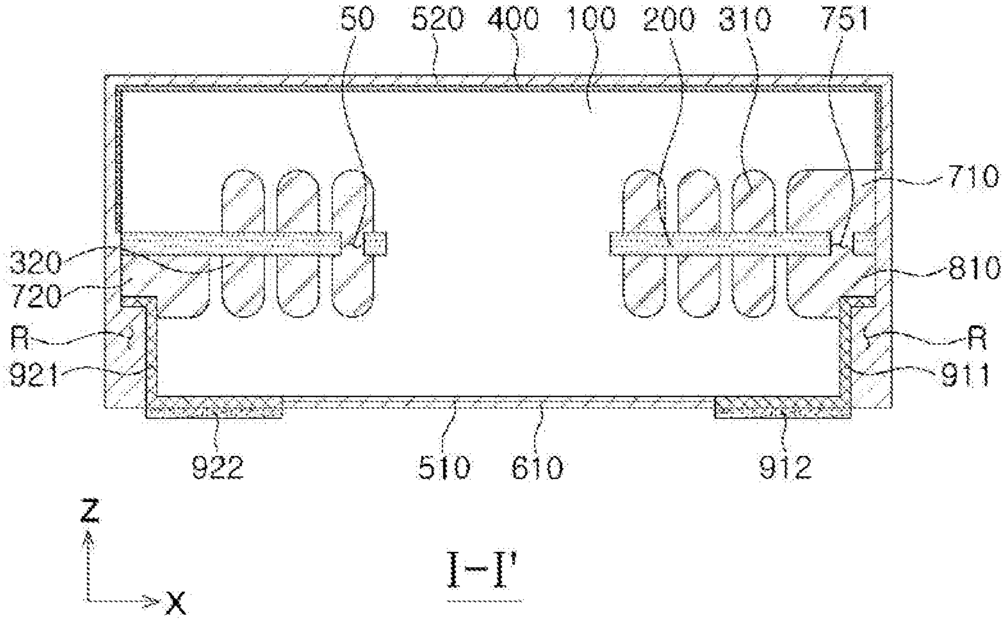
FIG. 3 is a cross-sectional view taken along line I-I' in FIG. 1.

FIG. 2 is a side perspective view of the coil component in FIG. 1, viewed from a lower side, and FIG. 3 is a cross-sectional view taken along line I-I' in FIG. 1.

Referring to FIGS. 1 to 3, a coil component 1000 according to a first embodiment may include a body 100, a support substrate 200, a coil portion 300, an oxide insulating layer 400, and a first insulating layer 500, and may further include a second insulating layer 600, lead-out portions 710 and 720, auxiliary lead-out portion 810, and external electrodes 910 and 920.

The body 100 forms the appearance of the coil component 1000 according to an embodiment, and includes the coil portion 300 embedded therein.

The body 100 may be formed to have a substantially hexahedral shape.

Referring to FIGS. 1 and 2, the body 100 has a first surface 101 and a second surface 102 opposing each other in a length direction X, a third surface 103 and a fourth surface 104 opposing each other in a width direction Y, and a fifth surface 105 and a sixth surface 106 opposing each other in a thickness direction Z. In this embodiment, one surface and the other surface of the body 100 respectively refer to the third surface 103 and the fourth surface 104, and one side surface and the other side surface of the body 100 respectively refer to the fifth surface 105 and the sixth surface 106. A plurality of wall surfaces of the body 100 may refer to the first surface 101, the second surface 102, the fifth surface 105, and the sixth surface 106 respectively connecting the third surface 103 and the fourth surface 104 to each other.

As an example, the body 100 may be formed such that the coil component, including the external electrodes 910 and 920 and the first insulating layer 500 to be described later, has a length of 2.0 mm, a width of 1.2 mm, and a thickness of 0.65 mm, but an example thereof is not limited thereto.

The body 100 may include a magnetic material and a resin. More specifically, the body 100 may be formed by laminating one or more magnetic composite sheets including a resin and a magnetic material dispersed in the resin. Alternatively, the body 100 may have a structure other than the structure in which the magnetic material is dispersed in the resin. For example, the body 100 may be formed of a magnetic material such as ferrite.

The magnetic material may be ferrite or magnetic metal powder particles.

The ferrite powder particles may be at least one of spinel type ferrites such as Mg—Zn type, Mn—Zn type, Mn—Mg type, Cu—Zn type, Mg—Mn—Sr type, Ni—Zn type and the like, hexagonal ferrites such as Ba—Zn type, Ba—Mg type, Ba—Ni type, Ba—Co type, Ba—Ni—Co type and the like, garnet type ferrites such as a Y system and the like, and Li-based ferrites.

The magnetic metal powder particles may include at least one selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may be at least one of pure iron powder particles, Fe—Si-based alloy powder particles, Fe—Si—Al based alloy powder particles, Fe—Ni based alloy powder particles, Fe—Ni—Mo based alloy powder particles, Fe—Ni—Mo—Cu based alloy powder particles, Fe—Co based alloy powder particles, Fe—Ni—Co based alloy powder particles, Fe—Cr based alloy powder particles, Fe—Cr—Si based alloy powder particles, Fe—Si—Cu—Nb based alloy powder particles, Fe—Ni—Cr based alloy powder particles, and Fe—Cr—Al based alloy powder particles.

The magnetic metal powder particles may be amorphous or crystalline. For example, the magnetic metal powder particles may be Fe—Si—B—Cr amorphous alloy powder particles, but are not limited thereto.

The ferrite particle and the magnetic metal powder particles may each have an average diameter of about 0.1 μm to 30 μm, but average diameters thereof are not limited thereto.

The body 100 may include two or more types of magnetic materials dispersed in a resin. The phrase "different types of magnetic materials" means that the magnetic materials dispersed in the resin are distinguished from each other by any one of an average diameter, a composition, crystallinity and a shape.

The resin may include, but is not limited to, an epoxy, polyimide, a liquid crystal polymer, or the like, alone or in combination.

The body 100 includes a core penetrating through the coil portions 300 to be described later. The core may be formed by filling a through-hole of the coil portion 300 with a magnetic composite sheet, but an embodiment thereof is not limited thereto.

Referring to FIGS. 1 to 3, the support substrate 200 is exposed to the first surface 101 and the second surface 102 of the body 100. The support substrate 200 may be embedded in the body 100 to support the coil portion 300 to be described later.

The support substrate 200 may be formed of an insulating material including a thermosetting insulating resin such as an epoxy resin, a thermoplastic insulating resin such as polyimide or a photoimageable dielectric resin, or may be formed of an insulating material in which this insulating resin is impregnated with a reinforcing material such as a glass fiber or an inorganic filler. For example, the insulating substrates 251 and 252 may be formed of an insulating material such as prepreg, Ajinomoto Build-up Film (ABF), FR-4, bismaleimide triazine (BT) resin, and a Photo Imageable Dielectric (PID) resin, or the like, but a material thereof is not limited thereto.

The inorganic filler may be one or more selected from the group consisting of silica ($SiO_2$), alumina ($Al_2O_3$), silicon carbide (SiC), barium sulphate ($BaSO_4$), talc, mud, mica powder, aluminum hydroxide ($AlOH_3$), magnesium hydroxide ($Mg(OH)_2$), calcium carbonate($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$).

When the support substrate 200 is formed of an insulating material including a reinforcing material, the support substrate 200 may provide further improved rigidity. When the support substrate 200 is formed of an insulating material, not including a glass fiber, the support substrate 200 may be advantageous for thinning the entire coil portion 300. When the support substrate 200 is formed of an insulating material including a photoimageable dielectric resin, the number of processes for forming the coil portion 300 may be decreased, which is advantageous for reductions in manufacturing costs and the formation of fine vias.

The recesses R are respectively formed on the first surface 101 and the second surface 102, opposing each other in the width direction Y, among the surfaces of the body 100, and extend to the third surface 103 of the body 100. Referring to FIGS. 1 to 3, the recesses R are formed along edge regions formed by the first and second surfaces 101 and 102 of the body 100 and the third surface 103 of the body 100. The recesses R do not extend to the fourth surface 104 of the body 100. For example, the recesses R do not penetrate through the body 100 in the thickness direction Z of the body 100.

The recesses R may be formed by pre-dicing a boundary line (a dicing line or a singulation line) between bodies 100 on one side of a coil bar. A pre-dicing tip, used for pre-dicing, is wider than the dicing line of the coil bar. The coil bar refers to a state in which a plurality of bodies 100 are connected to each other in the length direction X and the width direction Y of the body 100. The width of the dicing line refers to a width of a full-dicing tip of full-dicing for individualizing the coil bar.

Depths of the recesses R are adjusted in pre-dicing such that a portion of each of lead-out portions 710 and 720 to be described later may be removed, together with a portion of the body 100. For example, the depths of the recesses R are adjusted such that the lead-out portions 710 and 720 are exposed to internal surfaces of the recesses R. The depths of the recesses R are adjusted in pre-dicing so as not to entirely penetrate through one surface and the other surface of the coil bar. As a result, even after the pre-dicing, the coil bar may be maintained in a state in which a plurality of bodies are connected to each other.

Internal walls, internal surfaces, of the recesses R and bottom surfaces of the recesses R constitute the surface of the body 100. The recesses R may further have external surfaces of the recesses R disposed to oppose the internal surfaces of the recess R and to be parallel to the internal surfaces of the recesses R. In this specification, the internal walls of the recesses R refer to boundary surfaces distinguished from the internal surfaces of the recesses R and the surfaces of the body 100.

The coil portion 300 is embedded in the body 100 to exhibit characteristics of a coil component. For example, when the coil component 1000 is used as a power inductor, the coil portion 300 may serve to stabilize the power of an electronic device by storing an electric field as a magnetic field to maintain an output voltage.

In this embodiment, the coil portion 300 includes lead-out portions 710 and 720 and auxiliary lead-out portions 810 and 820.

Referring to FIGS. 1 to 3, the coil portion 300 is disposed on the support substrate 200, and has one end portion and the other end portion exposed to the recesses R. In this embodiment, the coil portion 300 includes a first coil portion 310, disposed on one surface of the support substrate 200, and a second coil portion 320 disposed on the other surface of the support substrate 200. Referring to FIG. 3, one end and the other end of the second coil portion 320, disposed on the other surface of the support substrate 200, are exposed to the recess R. In this embodiment, one end portion of the first coil portion 310 includes a first lead-out portion 710, one end portion of the second coil portion 320 includes a first auxiliary lead-out portion 810, and the other end portion of the second coil portion 320 includes a second lead-out portion 720. In this specification, for ease of description, one surface of the support substrate 200 will be described to refer to an upper surface, and the other surface of the support substrate 200 will be described to refer to a lower surface.

Referring to FIGS. 1 and 2, each of the first coil portion 310 and the second coil portion 320 may have a flat spiral shape while forming at least one turn on the core 110 as an axis in the center thereof. As an example, the first coil portion 310 may form at least one turn around the core portion on one surface of the support substrate 200.

The coil portion 300 may include a coil pattern having a flat spiral shape. The first and second coil portions 310 and 320, respectively disposed on both surface opposing each other in the support substrate 200, may be electrically connected to each other through a via electrode 50 formed in the support substrate 200.

The coil portions 310 and 320 and the via electrode 50 may be formed to include a metal having improved electrical conductivity and may be formed of, for example, silver (Ag), palladium (Pd), aluminum (Al), nickel (Ni), titanium (Ti), gold (Au), copper (Cu), platinum (Pt), or alloys thereof.

The lead-out portions 710 and 720 are disposed on the support substrate 200 and extend from the coil portion to be exposed to surfaces of the body 100, respectively. Referring to FIGS. 1 to 3, the first lead-out portion 310 is disposed on one surface of the support substrate 200 and extends from the first coil portion 310 to be exposed to the first surface 101 of the body. The second lead-out portion 720 is disposed on the other surface of the support substrate 200 and extends from the second coil portion 320 to be exposed to the second surface 102 of the body 100. Referring to FIG. 3, since the second lead-out portion 720 is disposed on a lower surface of the support substrate 200, the second lead-out portion 720 is exposed to the internal wall and the lower surface of the recess R.

The auxiliary lead-out portion 810 is disposed on the support substrate 200 to correspond to the lead-out portion 710. Referring to FIGS. 1 to 3, the first auxiliary lead-out portion 810 is disposed on the other surface of the support substrate 200 to correspond to the first lead-out portion 710 and is exposed to the first surface 101 of the body 110. Referring to FIG. 3, since the first auxiliary lead-out portion 810 is disposed on the lower surface of the support substrate 200, the first auxiliary lead-out portion 810 is exposed to the internal wall and the lower surface of the recess R. When the recess R is formed, a portion of each of the second lead-out portion 720 and the first auxiliary lead-out portion 810 is removed, together with a portion of the body 100. First and second external electrodes 910 and 920 to be described later are formed on the second lead-out portion 720 and the first auxiliary lead-out portion 810 exposed to the internal wall and the bottom surface of the recess R.

Referring to FIG. 3, the coil portion 300 further includes a first connection via 751 connecting the lead-out portions 710 and 720 and the auxiliary lead-out portion 810. The first connection via 751 penetrates through the support substrate 200 to electrically connect the first lead-out portion 710 and the first auxiliary lead-out portion 810 to each other. Although not illustrated in detail, the first connection via 751 may be exposed to the first surface 101 of the body 100.

As an example, when the coil portions 310 and 320, the lead-out portions 710 and 720, the auxiliary lead-out portion 810, and the via electrode 50 are formed on one surface or the other surface of the support substrate 200 by plating, the coil portions 310 and 320, the lead-out portions 710 and 720, the auxiliary lead-out portion 810, and the via electrode 50 may each include a seed layer such as an electroless plating layer and an electroplating layer. In this case, the electroplating layer may have a single-layer structure or a multilayer structure. The electroplating layer having a multilayer structure may be formed to have a conformal layer structure in which one electroplating layer is covered with another electroplating layer, and may be formed to have a structure in which one electroplating layer is laminated on only one surface of another electroplating layer. Seed layers of the coil portions 310 and 320, seed layers of the lead-out portions 710 and 720, seed layers of the auxiliary lead-out portion 810, and seed layers of the via electrode 50 may be integrally formed, such that boundaries therebetween may not be formed, but an embodiment thereof is not limited thereto. Electroplating layers of the coil portions 310 and 320, electroplating layers of the lead-out portions 710 and 720, electroplating layers of the auxiliary lead-out portion 810, and an electroplating layer of the via electrode 50 are integrally formed, such that boundaries therebetween may not be formed, but an embodiment thereof is not limited thereto.

The coil portions 310 and 320, the lead-out portions 410 and 420, the auxiliary lead-out portion 810, and the via electrode 50 may be formed of a conductive material such as copper (Cu), aluminum (Al), silver (Ag), tin (Sn), gold (Au), nickel (Ni), lead (Pb), titanium (Ti), or alloys thereof, but a conductive material thereof is not limited thereto.

The oxide insulating layer 400 is disposed on the surface of the body 100. Specifically, the oxide insulating layer 400 may be formed by oxidizing the metal magnetic powder particles exposed on the surface of the body 100. For example, when the metal magnetic powder particles include iron (Fe), the oxide insulating layer 400 may be formed by acidizing the surface of the body 100 with an etchant selectively reacting with iron (Fe). However, a method of forming the oxide insulating layer 400 is not limited thereto, and the oxide insulating layer 400 may be formed by anode passivation in which electrolysis is performed using a metal such as iron (Fe) an anode.

Referring to FIG. 3, the oxide insulating layer 400 may be formed on the surface of the body 100 except for a region, in which the lower insulating layer 510 is formed, after forming the lower insulating layer 510 to be described later. Accordingly, when an external electrode is plated, plating may be prevented from bleeding into the surface of the body 100.

Referring to FIG. 3, the oxide insulating layer 400 is disposed in an area of the surface of the body 100 except for an area in which the support substrate 200 is exposed to the surface of the body 100. Since the support substrate 200 does not include metal magnetic powder particles, the oxide insulating layer 400 is not formed even when the support substrate 200 is acidized. As a result, the oxide insulating layer 400 is disposed in a region of the surface of the body 100 except for a region in which the support substrate 200 is exposed to the first surface 101 and the second surface 102 of the body 100.

Referring to FIG. 3, the oxide insulating layer 400 is disposed on a surface of the body 100 except for regions in which the first and second lead-out portions 710 and 720 and the first auxiliary lead-out portion 810 are disposed. Since the oxide insulating layer 400 is formed by an oxidation reaction of the magnetic metal powder particles including iron (Fe), it may be difficult to form the oxide insulating layer 400 in a region including copper (Cu). As a result, referring to FIG. 3, the oxide insulating layer 400 may not be formed in the region of the surface of the body 100, in which the lead-out portions 710 and 720 and the auxiliary lead-out portion 810 are disposed.

Although not illustrated in detail, rather than the above-mentioned oxidation reaction, a reduction reaction may occur on the first surface 101 of the body 100 on which the first auxiliary lead-out portion 810 and the first lead-out portion 710 are disposed. As a result, a copper (Cu)-plated portion of the region, in which the first auxiliary lead-out portion 810 and the second lead-out portion 720 are disposed, may be increased to improve electrical connectivity between the coil portion 300 and the external electrodes 910 and 920.

The oxide insulating layer 400 may be selectively formed on the surface of the body 100 before the external electrodes 910 and 920 are formed by electroplating, preventing plating on a region, in which the external electrodes 910 and 920 are formed, of the surface of the body 100. For example, the oxide insulating layer 400 is a passivation layer formed by an oxidation reaction, and serves to lower the electrical conductivity of the surface of the body 100. In addition, after the plating process, the oxide insulating layer 400 may serve to prevent electrical short-circuit between the coil component of the present disclosure and other electronic components.

The first insulating layer 500 is formed along a surface of the oxide insulating layer 400 and the surface of the body 100 to cover the surface of the body 100. For example, in this embodiment, the oxide insulating layer 400 and the first insulating layer 500, covering the oxide insulating layer 400, are sequentially disposed on the first and second surfaces 101 and 102, among the surfaces of the body 100.

Referring to FIG. 3, the first insulating layer 500 includes a lower insulating layer 510 covering the third surface 103 of the body 100. After the recess R is formed as described above, the lower insulating layer 510 may be disposed on the third surface 103 of the body 100. The lower insulating layer 510 is a patterned insulating layer for plating, and a plating process may be performed in a region except for a region in which the lower insulating layer 510 is disposed. Since connection portions 911 and 921 to be described later are not disposed in the region in which the insulating layer 510 is disposed, plating of the external electrodes 910 and 920 may be prevented from bleeding into the body 100.

The lower insulating layer 510 is formed by forming a patterned insulating layer using an inkjet, or by applying an insulating layer 500 to the third surface 103 of the body 100 using a spray and processing a portion of the insulating layer 500 with a laser. In this case, the laser may be a $CO_2$ laser, an ultraviolet (UV) laser, an infrared (IR) laser, a green laser, or the like, but may be, in detail, UV laser, to significantly reduce heat generation and increase precision.

Referring to FIG. 3, the first insulating layer 500 may include a five-surface insulating layer 520 to cover the first surface 101, the second surface 102, the fifth surface 105, the sixth surface 106, and the fourth surface 104 of the body 100. The five-surface insulating layer 520 is disposed on the oxide insulating layer 400 to cover the surface of the body 100. The five-surface insulating layer 520 is formed along the surface of the body 100 to fill the above-described recess R.

The insulating layer 500 may include an insulating material including a resin. The first insulating layer 500 may include a thermoplastic resin such as a polystyrene type resin, a vinyl acetate type resin, a polyester type resin, a polyethylene type resin, a polypropylene type resin, a polyamide type resin, a rubber type resin or an acrylic type resin, a thermosetting resin such as a phenol type resin, an epoxy type resin, a urethane type resin, a melamine type resin or an alkyd type resin, a photoimageable resin, parylene, $SiO_x$, or $SiN_x$. In addition, the first insulating layer 500 may include an insulating material known in the art such as parylene, or the like. An insulating material, included in the first insulating layer 500, may be any insulating material and is not limited to a specific insulating material.

The insulating layer 610 may be formed by applying a liquid insulating resin to the body 100, by laminating an insulating film such as a dry film (DF) on the body 10, or by forming an insulating material on the body 10 and the connection portions 911 and 921 by vapor deposition.

Since the first insulating layer 500 is disposed on the above-described oxide insulating layer 400, an insulation effect may be enhanced by an increase in bonding force of a boundary between the oxide insulating layer 400 and the first insulating layer 500.

The external electrodes 910 and 920 are connected to one end portion and the other end portion of the coil portion 300, and are formed along one surface of the body 100. Referring to FIG. 3, the first external electrode 910 is connected to the first auxiliary lead-out portion 810, one end portion of the second coil portion 320, and is formed along an internal surface of the recess R and one surface of the body 100. The second external electrode 920 is connected to the second lead-out portion 720, the other end portion of the second coil portion 320, and is formed along the internal surface of the recess R and one surface of the body 100. Since the first and second external electrodes 910 and 920 are disposed in the above-described recess R, the first and second external electrodes 910 and 920 are spaced apart from each other in the length direction X of the body 100.

Referring to FIGS. 1 to 3, the first and second external electrodes 910 and 920 include connection portions 911 and 921, disposed along the recess R, and pad portions 912 and 922 disposed on the third surface 103 of the body 100, respectively. The first external electrode 910 includes a first connection portion 911, extending to the third surface 103 of the body 100 along the recess R, and the second external electrode 920 includes a second connection portion 921 extending to the third surface 103 of the body 100 along the recess R. In addition, the first external electrode 910 includes a first pad portion 912, connected to the first connection portion 911 to cover the third surface 103 of the body 100, and the second external electrode 920 includes a second pad portion 922 connected to the second connection portion 912 to cover the third surface 103 of the body 100.

The connection portions 911 and 921 are integrally formed along the bottom surface of the recess R, the internal wall of the recess R, and the surface of the body 100. The connection portions 911 and 921 extend to the internal surface of the recess R in the form of a conformal film to constitute the external electrodes 910 and 920.

The external electrodes 910 and 920 may be integrally formed on the internal surface of the recess R and the third surface 103 of the body 100. For example, the first connection portion 911 and the second connection portion 912 may be formed together in the same process to be integrally formed with each other, and the first pad part 912 and the second pad part 922 may be integrally formed together in the same process. The external electrodes 910 and 920 may be formed by a thin-film process such as a sputtering process.

The external electrodes 910 and 920 may be formed of a conductive material such as copper (Cu), aluminum (Al), silver (Ag), tin (Sn), gold (Au), nickel (Ni), lead (Pb), chromium (Cr), titanium (Ti), or alloys thereof, but a conductive material of the external electrodes 910 and 920 is not limited thereto. The external electrodes 910 and 920 may be formed to have a single-layer structure or a multilayer structure.

Due to the above-described recess (R) structure, sizes of the external electrodes 910 and 920, disposed on external surfaces of the body 100, may be significantly decreased to further miniaturize a component.

Modified Version of First Embodiment

Figure 4:
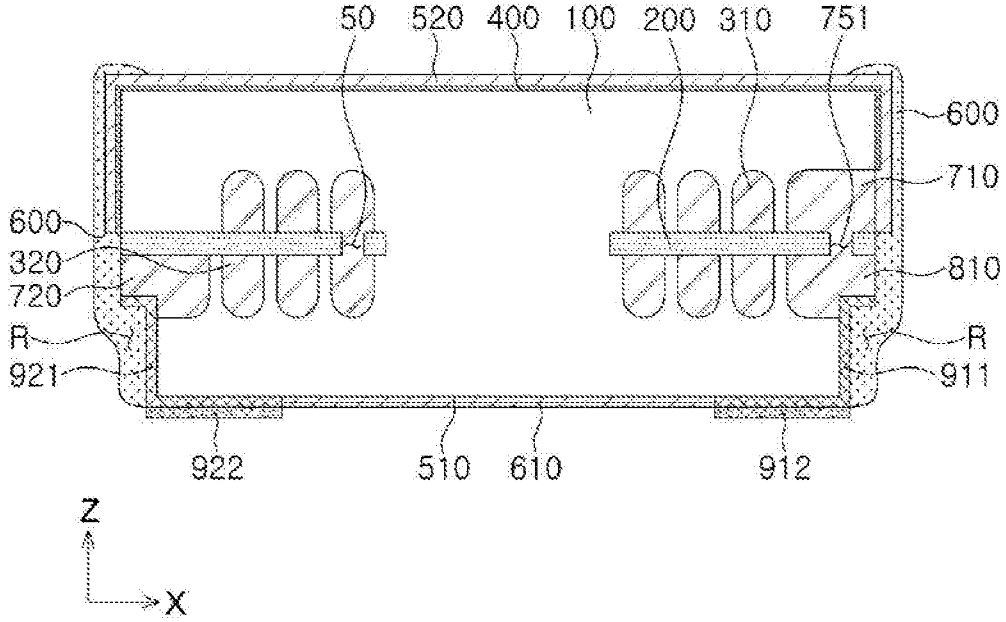
FIG. 4 illustrates a coil component according to a modified version of the first embodiment in the present disclosure, and corresponds to the cross-sectional view taken along the line I-I' in FIG. 1.

FIG. 4 illustrates a coil component according to a modified version of the first embodiment in the present disclosure, and corresponds to the cross-sectional view taken along the line I-I' in FIG. 1.

Referring to FIG. 4, a coil component 1000 according to a first modified version of the first embodiment is different in a material of a first insulating layer 500 and presence of a second insulating layer 600, as compared to the coil component 1000 according to the first embodiment. Therefore, only the material of the first insulating layer 500 and a structure of the second insulating layer 600, different from those of the first embodiment, will be described. The descriptions of the first embodiment may be applied to the rest of the configuration of this embodiment as it is.

Referring to FIG. 4, the first insulating layer 500 includes silica ($SiO_2$). In detail, the first insulating layer 500 may include a glass including silica ($SiO_2$). For example, the first insulating layer 500 may include an inorganic oxide filler including silica ($SiO_2$).

The second insulating layer 600 is disposed on the first insulating layer 500 to cover a first surface 101 and a second surface 102 of a body 100. For example, in this modified version, an oxide insulating layer 400, the first insulating layer 500 covering the oxide insulating layer 400, and the second insulating layers 600 covering the first insulating layer 500 are sequentially disposed on the first and second surfaces 101 and 102 among surfaces of the body 100.

The second insulating layer 600 covers a portion of a fourth surface 104 of the body 100 and covers the surface of the body 100 along an external surface of a recess R.

Since the second insulating layer 600 is disposed on the first insulating layer 500 after formation of the above-described recess R, the second insulating layer 600 is disposed along the surface of the body 100 in which the recess R is formed. The second insulating layer 600 may be formed by thinning an epoxy resin or the like.

In detail, since the second insulating layer 600 insulates the first surface 101 and the second surface 102 of the body 100, plating bleeding may be further effectively alleviated when the external electrodes 910 and 920 are plated. In addition, due to a triple insulating structure of the oxide insulating layer 400, the first insulating layer 500, and the second insulating layer 600, an insulation effect may be further enhanced.

Second Embodiment

Figure 5:
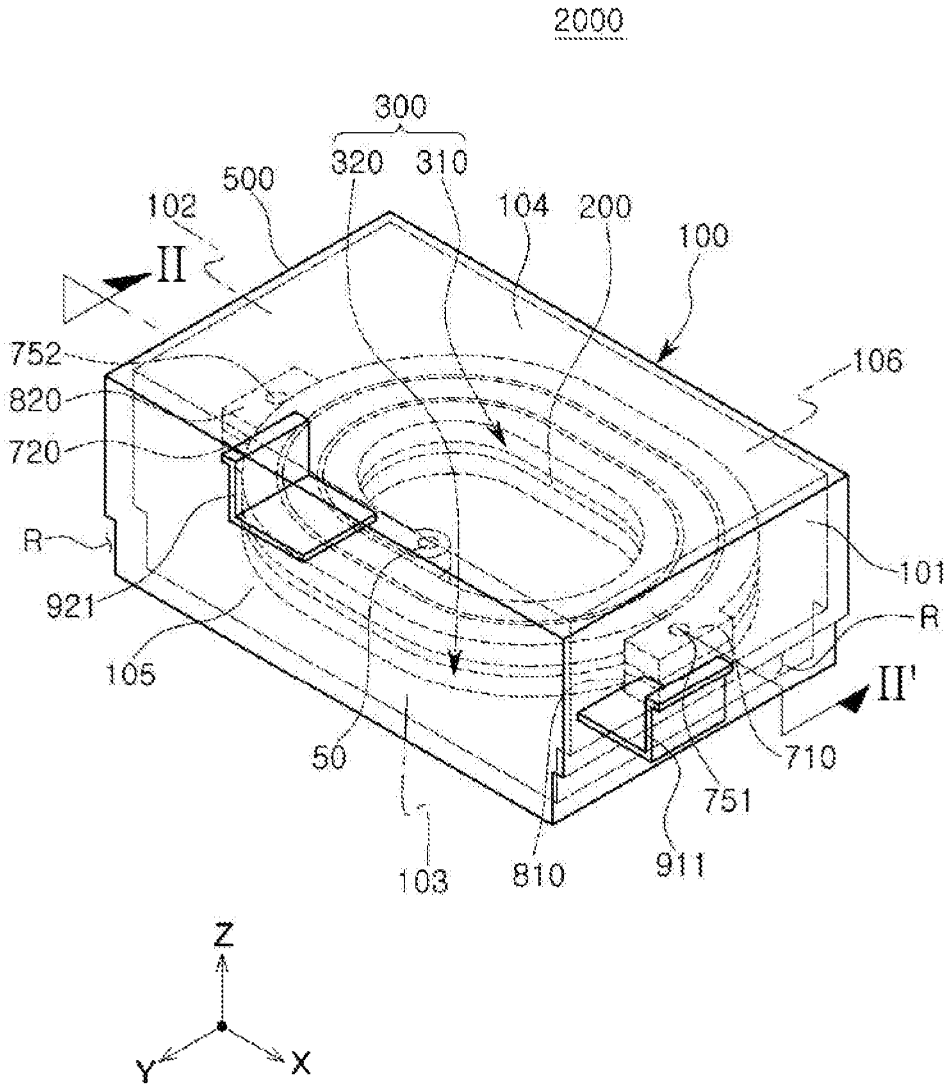
FIG. 5 is a schematic diagram of a coil component according to a second embodiment in the present disclosure, and corresponds to FIG. 1.
Figure 6:
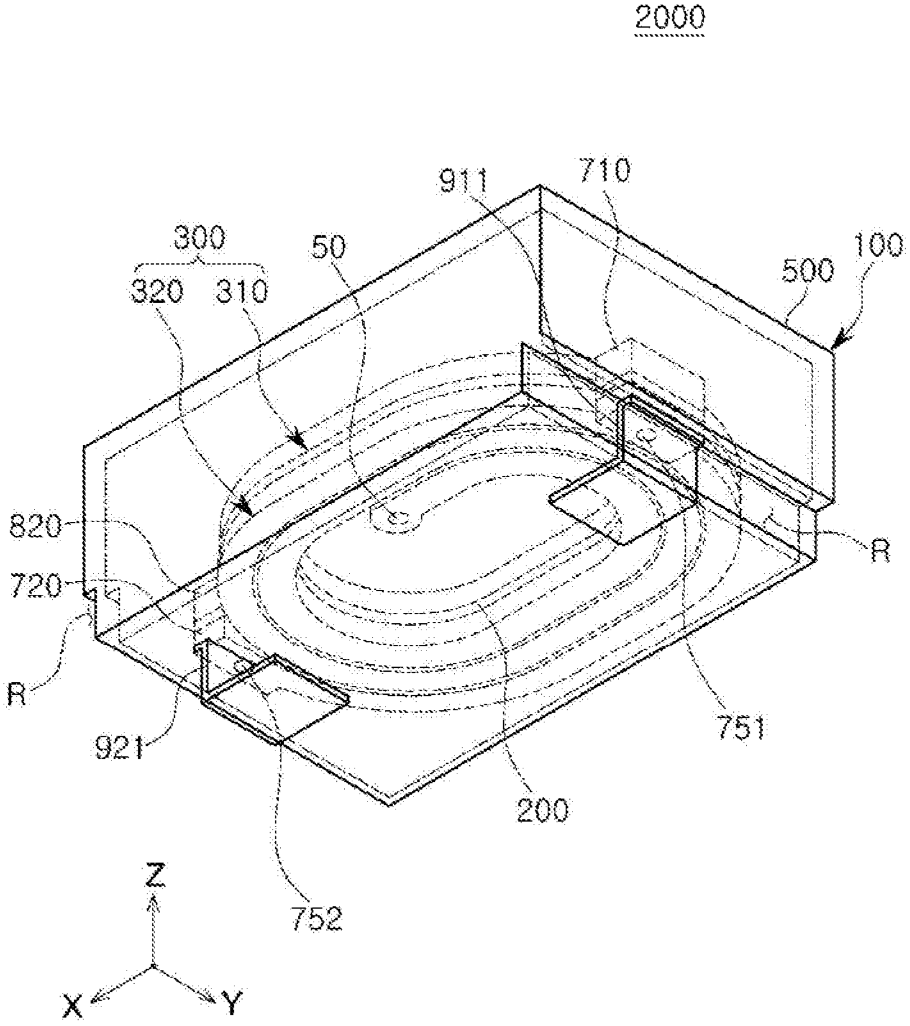
FIG. 6 is a perspective view of the coil component in FIG. 5, viewed from a lower side, and corresponds to FIG. 2.
Figure 7:
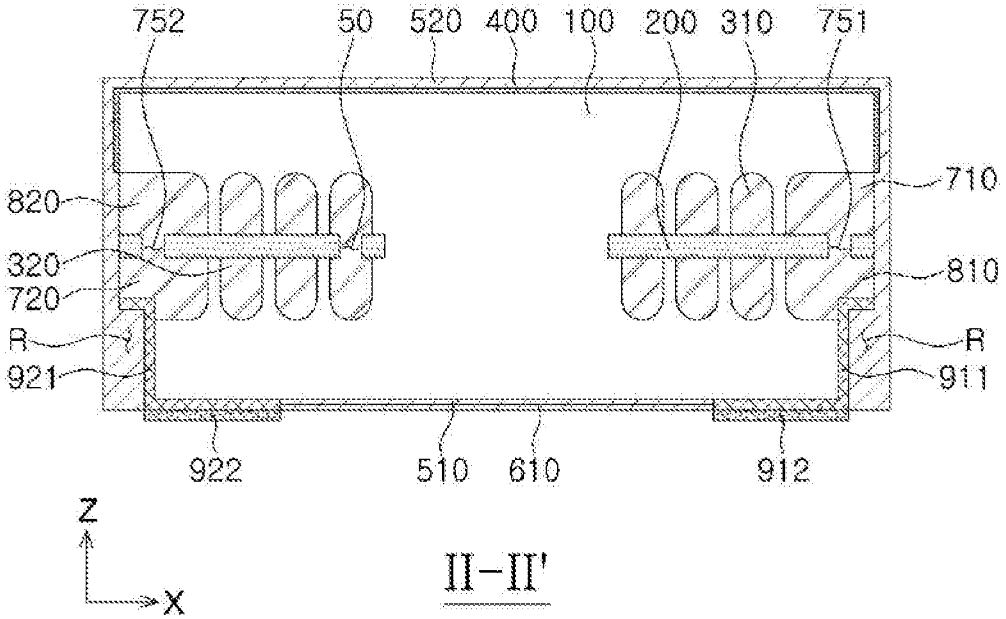
FIG. 7 is a cross-sectional view taken along line II-II' in FIG. 5, and corresponds to FIG. 3.

FIG. 5 is a schematic diagram of a coil component according to a second embodiment in the present disclosure, and corresponds to FIG. 1. FIG. 6 is a perspective view of the coil component in FIG. 5, viewed from a lower side, and corresponds to FIG. 2. FIG. 7 is a cross-sectional view taken along line II-II' in FIG. 5, and corresponds to FIG. 3.

Referring to FIGS. 5 to 7, a coil component 2000 according to the second embodiment further includes a second auxiliary lead-out portion 820 and a second connection via 752, as compared with the coil component 1000 according to the first embodiment.

Therefore, only the second auxiliary lead-out portion 820 and the second connection via 752, different from those of the first embodiment, will be described. The descriptions of the first embodiment may be applied to the rest of the configuration of this embodiment as is.

Referring to FIGS. 5 to 7, the second auxiliary lead-out portion 820 is disposed on one surface of a support substrate 200, and is disposed to correspond to a second lead-out portion 720.

An oxide insulating layer 400 is disposed in a region of a surface of a body 100 except for a region in which the second auxiliary lead-out portion 820 is disposed.

A second connection via 752 is further provided to connect the second auxiliary lead-out portion 820 and the second lead-out portion 720 to each other.

As the second auxiliary lead-out portion 820 is disposed, areas lead-out portions 710 and 720 and auxiliary lead-out portions 810 and 820, disposed on the first surface 101 and the second surface 102 of the body 100, are increased and bonding forces between the lead-out portions 710 and 720 and the auxiliary lead-out portions 810 and 820 and the external electrodes 910 and 920 are further enhanced.

Although not illustrated in detail, the above-mentioned reduction reaction may occur in first and second surfaces 101 and 102 of the body 100 on which the auxiliary lead-out portions 810 and 820 and the lead-out portions 710 and 720 are disposed. Reduction reactions may occur. As a result, a copper (Cu)-plated portion of the region, in which the auxiliary lead-out portions 810 and 820 and the lead-out portions 710 and 720 are disposed, may be increased to improve electrical connectivity between a coil portion 300 and external electrodes 910 and 920.

First Modified Version of Second Embodiment

Figure 8:
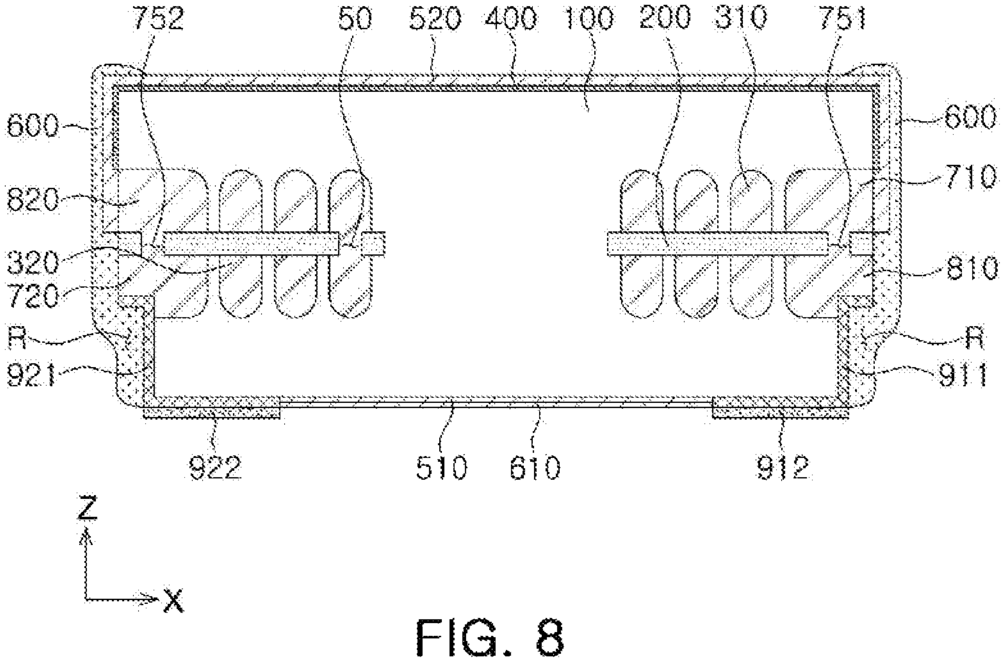
FIG. 8 illustrates a coil component according to a modified version of the second embodiment in the present disclosure.

FIG. 8 illustrates a coil component according to a modified version of the second embodiment in the present disclosure.

Referring to FIG. 8, a coil component 2000 according to the second modified version of the second embodiment is different a material of a first insulating layer 500 and presence of a second insulating layer 600 are different, as compared with the coil component 2000 according to the second embodiment. Therefore, only the material of a first insulating layer 500 and a structure of a second insulating layer 600, different from those of the second embodiment, will be described. The descriptions of the second embodiment may be applied to the rest of the configuration of this embodiment as it is.

Referring to FIG. 8, the first insulating layer 500 includes silica ($SiO_2$). In detail, the first insulating layer 500 may include a glass including silica ($SiO_2$). As an example, the first insulating layer 500 may include an inorganic oxide filler including silica ($SiO_2$).

The second insulating layer 600 is disposed on the first insulating layer 500 to cover a first surface 101 and a second surface 102 of a body 100.

The second insulating layer 600 covers a portion of the fourth surface 104 of the body 100 and covers a surface of the body 100 along an external surface of a recess R.

Since the second insulating layer 600 is disposed on the first insulating layer 500 after formation of the above-described recess R, the second insulating layer 600 is disposed along the surface of the body 100 in which the recess R is formed. The second insulating layer 600 may be formed by thinning an epoxy resin or the like.

In detail, since the second insulating layer 600 insulates the first surface 101 and the second surface 102 of the body, plating bleeding may be further effectively alleviated when the external electrodes 910 and 920 are plated. In addition, due to a triple insulating structure of the oxide insulating layer 400, the first insulating layer 500, and the second insulating layer 600, an insulation effect may be further enhanced.

As described above, according to an embodiment, plating bleeding of an external electrode may be prevented while significantly reducing loss of a magnetic material.

In addition, according to an embodiment, an insulating layer application area by the same volume may be increased.

While example embodiments have been shown and described above, it will be apparent to those skilled in the art that modifications and variations could be made without departing from the scope of the present disclosure as defined by the appended claims.

What is claimed is:

1. A coil component comprising:

a body having one surface and another surface, opposing each other, and one side surface and another side surface, each connecting the one surface and the other surface to each other, opposing each other;

a recess formed in each of the one side surface and the other side surface of the body to extend to the one surface of the body;

a support substrate disposed inside the body;

a coil portion, disposed on the support substrate, having one end portion and another end portion exposed to the recess;

first external electrode connecting a first end of the coil portion;

second external electrode connecting a second end of the coil portion;

an oxide insulating layer disposed on a surface of the body; and a first insulating layer disposed along a surface of the oxide insulating layer to cover the surface of the body, wherein each of the first and second external electrodes comprises a connection portion including a first portion formed along a bottom surface of the recess and an internal wall of the recess, and a second portion formed along the one surface of the body, and wherein only the first portion of the first and second external electrode is covered by at least one of the first insulating layer and a second insulating layer disposed on the first insulating layer.

2. The coil component of claim 1, wherein the second insulating layer is disposed on the first insulating layer to cover the one side surface and the other side surface of the body.

3. The coil component of claim 2, wherein the second insulating layer covers a portion of the other surface of the body and covers the surface of the body along an external surface of the recess.

4. The coil component of claim 1, wherein the first insulating layer comprises:

a lower insulating layer covering the one surface of the body; and a five-surface insulating layer covering the one side surface, the other side surface, one end surface, the other end surface, and the other surface.

5. The coil component of claim 1, wherein the first insulating layer is disposed along the surface of the body.

6. The coil component of claim 1, wherein the first insulating layer comprises a resin.

7. The coil component of claim 1, wherein the first insulating layer comprises silica ($SiO_2$).

8. The coil component of claim 1, wherein the support substrate is exposed to the one side surface and the other side surface of the body, and the oxide insulating layer is disposed in a region of the surface of the body, except for a region in which the support substrate is exposed to the surface of the body.

9. The coil component of claim 1, wherein the coil portion comprises:

a first lead-out portion and a second lead-out portion, respectively disposed on one surface and the other surface of the support substrate, extending from the coil portion to be respectively exposed to the one side surface and the other side surface of the body; and a first auxiliary lead-out portion, disposed on the other surface of the support substrate, and a second auxiliary lead-out portion disposed on the one surface of the support substrate, and wherein the first and second auxiliary lead-out portions are disposed to correspond to the first and second lead-out portions, respectively.

10. The coil component of claim 9, wherein the oxide insulating layer is disposed on a region of the surface of the body except for a region in which the first and second lead-out portions and the first and second auxiliary lead-out portions are disposed.

11. The coil component of claim 9, wherein the first auxiliary lead-out portion and the second lead-out portion are connected to an internal wall and a bottom surface of the recess.

12. The coil component of claim 1, further comprising:

a first external electrode connected to the one end portion of the coil component and formed along the one surface of the body; and a second external electrode connected to the other end portion of the coil portion and formed along the one surface of the body to be spaced apart from the first external electrode.

13. The coil component of claim 12, wherein each of the first and second external electrodes comprises:

a connection portion disposed in the recess to be connected to the first and second lead-out portions; and a pad portion, connected to the connection portion, covering the one surface of the body.

14. A coil component comprising:

a body having one surface another surface, opposing each other, and a plurality of wall surfaces each connecting the one surface and the other surface of the body to each other;

a support substrate disposed inside the body;

a recess formed in respective opposite side surfaces of the body, among the plurality of wall surfaces of the body, to extend to the one surface of the body;

a coil portion, disposed on the support substrate, having one end portion and another end portion exposed to the recess;

a first external electrode to be connected to the one end portion of the coil portion;

a second external electrode to be connected to the other end portion of the coil portion;

an oxide insulating layer disposed on a surface of the body; and a first insulating layer disposed along a surface of the oxide insulating layer and the surface of the body to cover the surface of the body, wherein each of the first and second external electrodes comprises a connection portion including a first portion formed along a bottom surface of the recess and an internal wall of the recess, and a second portion formed along the one surface of the body, and wherein only the first portion of the first and second external electrode is covered by one or both of the first insulating layer and a second insulating layer disposed on the first insulating layer.

* * * * *